(12) United States Patent
Junk et al.

(10) Patent No.: US 7,516,043 B2
(45) Date of Patent: Apr. 7, 2009

(54) TRIGGERED FIELD DEVICE DATA COLLECTION IN A PROCESS CONTROL SYSTEM

(75) Inventors: Kenneth W. Junk, Marshalltown, IA (US); Annette L. Latwesen, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 660 days.

(21) Appl. No.: 10/631,254

(22) Filed: Jul. 31, 2003

(65) Prior Publication Data

US 2005/0028037 A1 Feb. 3, 2005

(51) Int. Cl.
*G01F 19/00* (2006.01)
(52) U.S. Cl. .................................... 702/183; 701/29
(58) Field of Classification Search ................ 702/188, 702/29, 33, 35, 113–115, 50, 127, 121–123, 702/130, 138, 145, 176, 177, 178, 182–185; 701/29, 31, 35, 25
See application file for complete search history.

(56) References Cited

U.S. PATENT DOCUMENTS

| | | | | |
|---|---|---|---|---|
| 5,428,769 | A * | 6/1995 | Glaser et al. | 700/4 |
| 6,026,352 | A | 2/2000 | Burns et al. | 702/182 |
| 6,298,454 | B1 | 10/2001 | Schleiss et al. | 714/37 |
| 2006/0142875 | A1 * | 6/2006 | Keyes et al. | 700/1 |

FOREIGN PATENT DOCUMENTS

DE 100 07 972 A1 10/2000
WO WO 02/05199 A1 1/2002
WO WO 02/054162 A2 7/2002

OTHER PUBLICATIONS

Fieldvue® DVC6000 Series Digital Valve Controllers, Quick-Start Guide, Nov. 2000 including Errata Sheet from Jan. 2001.
"Fieldvue® Instrumentation Digital Valve Controller" Catalog, 2002.
"Looking at Valve Performance From Ground Level has its Advantages" Flyer, 2002.
"Fieldvue® Instrumentation VL2000 Series ValveLink® Software" Catalog, 2002.
"Method and Apparatus for Performing Diagnostics in a Control Loop of a Control Valve", U.S. Appl. No. 10/139,008, filed May 3, 2002.
"Automatic Linkage of Process Event Data to a Data Historian", U.S. Appl. No. 10/385,310, filed Mar. 10, 2003.
"Method and Apparatus for Performing Diagnostics in a Control Loop of a Control Valve", U.S. Appl. No. 10/644,207, filed Aug. 20, 2003.
International Search Report in PCT/US04/22416 dated Dec. 6, 2004
Written Opinion in PCT/US04/22416 dated Dec. 6, 2004.

\* cited by examiner

*Primary Examiner*—Edward Raymond
(74) *Attorney, Agent, or Firm*—Marshall, Gerstein & Borun LLP (57) ABSTRACT

A diagnostic system and method for a field device in a process control apparatus is provided. At least one sensor is associated with the process control apparatus, and a computer is adapted to receive data from the sensor and to detect an occurrence of a predetermined process event. A memory device is operatively connected to the computer and adapted to store sensor data received by the computer at a time corresponding to the occurrence of the predetermined process event.

19 Claims, 7 Drawing Sheets

TRIGGERED FIELD DEVICE DATA COLLECTION IN A PROCESS CONTROL SYSTEM

FIELD OF TECHNOLOGY

The present invention relates generally to process control systems and, more particularly, to diagnostic systems and methods for process control systems.

DESCRIPTION OF THE RELATED ART

Distributed process control systems, like those used in chemical, petroleum or other processes, typically include one or more process controllers communicatively coupled to one or more field devices via analog, digital or combined analog/digital buses. The field devices, which may be, for example, valves, valve positioners (e.g., digital valve positioners), switches and transmitters (e.g., temperature, pressure, level and flow rate sensors), are located within the process environment and perform process functions such as opening or closing valves, measuring process parameters, etc. Smart field devices, such as the field devices conforming to the well known FOUNDATION® Fieldbus protocol may also perform control calculations, alarming functions, and other control functions commonly implemented within the controller. The process controllers, which are also typically located within the sometimes harsh plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART and Fieldbus field devices. The control modules in the controller send the control signals over the communication lines to the field devices to thereby control the operation of the process plant.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, generating reports on the activity and operation of sections or units within the process plant, etc.

As an example, the Delta VTM control system, sold by Fisher Rosemount Systems, Inc. includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. The configuration application may also enable a user to specify specific relationships between control modules and other higher level entities within the process plant, such as equipment and units for which the control modules are to be executed.

Each dedicated controller and, in some cases, field device, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As noted above, information from the field devices and the controller is typically made available to one or more applications executed by the operator workstation. This enables an operator to perform any desired function with respect to the process, such as viewing the current state of the process, modifying the operation of the process, etc. One important function is to monitor the performance of valves in order to detect process events, such as the opening of a normally closed valve, in order to assess process performance, for example, to identify a possible need for repairs or maintenance.

Today, triggered data collection does not exist in field devices such as digital valve positioners. However, being able to trigger data collection off of a predetermined process event is particularly useful in many applications, since plant personnel may not be monitoring the field device when an event of interest occurs. For example, turbine bypass valves and compressor anti-surge valves are safety devices that are normally closed. However, if a trip occurs, these valves are brought into throttling control. It is during these intermittent transients that data should be collected and the health of the control valve evaluated. Since trips are not part of normal operating conditions, it is unlikely that these valves will be monitored when a trip occurs.

Accordingly, there exists a need for providing triggering capability to field device hardware, firmware, and/or software used for process control systems to capture data when an event of interest occurs.

SUMMARY OF THE DISCLOSURE

In one embodiment, a diagnostic system for a field device in a process control apparatus is provided. At least one sensor is associated with the process control apparatus, and a computer is adapted to receive data from the sensor and to detect an occurrence of a predetermined process event. A memory device is operatively connected to the computer and adapted to store sensor data received by the computer at a time corresponding to the occurrence of the predetermined process event.

DETAILED DESCRIPTION

Figure 1:
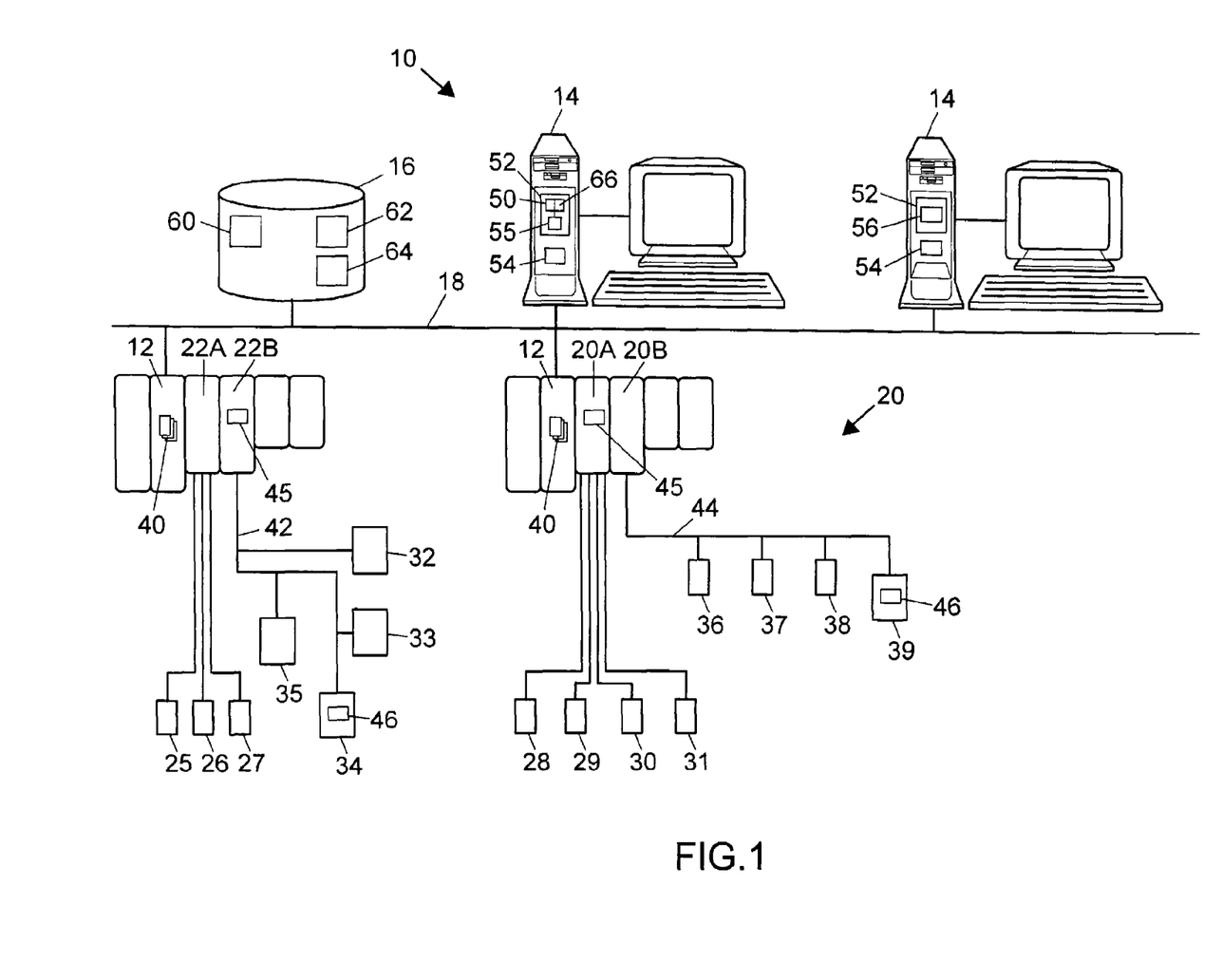
FIG. 1 is a block diagram of a distributed process control network located within a process plant, including field devices and an operator workstation that are adapted to implement triggered data collection.

Referring now to FIG. 1, a process control network or system 10 includes one or more process controllers 12 connected to one or more host workstations or computers 14 (which may be any type of personal computer, workstation or other computer) and to a data historian 16 via a communication connection 18. The communication connection 18 may be, for example, an Ethernet communication network or any other desired type of private or public communication network. Each of the controllers 12 is connected to one or more input/output (I/O) devices 20, 22 each of which, in turn, is connected to one or more field devices 25 through 39. While two controllers 12 are illustrated in FIG. 1 as connected to fifteen field devices, the process control system 10 could include any other number of controllers and any desired number and types of field devices. Of course, the controllers 12 are communicatively connected to the field devices 25 through 39 using any desired hardware and software associated with, for example, standard 4-20 ma devices and/or any smart communication protocol such as the Fieldbus or HART protocols. As is generally known, the controllers 12, which may be, by way of example only, Delta VTM controllers sold by Fisher Rosemount Systems, Inc., implement or oversee process control routines or control modules 40 stored therein or otherwise associated therewith and communicate with the devices 25 through 39 to control a process in any desired manner.

The field devices 25 through 39 may be any types of devices, such as sensors, valves, transmitters, positioners, etc. while the I/O cards 20 and 22 may be any types of I/O devices conforming to any desired communication or controller protocol such as HART, Fieldbus, Profibus, etc. In the embodiment illustrated in FIG. 1, the field devices 25 27 are standard 4-20 ma devices that communicate over analog lines to the I/O card 22A. The field devices 28 31 are illustrated as HART devices connected to a HART compatible I/O device 20A. Similarly, the field devices 32 39 are smart devices, such as Fieldbus field devices, that communicate over digital bus 42 or 44 to the I/O cards 20B or 22B using, for example, Fieldbus protocol communications. Of course, the field devices 25 through 39 and the I/O cards 20 and 22 could conform to any other desired standard(s) or protocols besides the 4-20 ma, HART or Fieldbus protocols, including any standards or protocols developed in the future. As will be understood, each of the field devices 25-39 is typically associated with or is part of equipment within one or more specified units within the process plant. In a similar manner, each of the controllers 12 implements control modules 40 associated with one or more units or other entities, such as area, within the process plant to perform operations on those units, areas, etc. In some cases, parts of the control modules may be located in and executed by the I/O devices 22 or 20 and the field devices 25-39. This is particularly the case with FOUNDATION® Fieldbus field devices 32-39. Modules or portions of modules 45 are illustrated as being located in the I/O cards 20A, 22B and modules or portions of modules 46 are illustrated as being located in the field devices 34 and 39.

Typically, each of the modules 40, 45 and 46 is made up on one or more interconnected function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course hybrid and other types of function blocks exist. Both function blocks and modules may be stored in and executed by the controllers 12, which is typically the case when these function blocks are used for, or are associated with standard 4-20 ma devices and some types of smart field devices, or may be stored in and implemented by the field devices themselves, which may be the case with FOUNDATION® Fieldbus devices. While the description of the control system 10 is provided herein using function block control strategy, the control strategy could also be implemented or designed using other conventions, such as ladder logic, sequential flow charts, etc. and using any desired proprietary or non proprietary programming language.

In the system 10 of FIG. 1, one or more of the host devices 14 serves as an operator workstation and includes configuration software 50 that is stored in a memory 52 and that is adapted to be executed on a processor 54 of the workstation 14. Of course the processor 54 may be any desired type of processor and the memory 52 may be any desired type of computer readable memory, including RAM, ROM, memory on a hard drive or a magnetic or optical storage medium, a dedicated memory or a transportable memory, such as a magnetic or optical disc, etc. Still further, the processor 54 and the memory 52 may be combined in, for example, an ASIC or firmware configuration. Generally speaking, the configuration software 50 enables a configuration engineer to perform configuration activities within the process plant including creating and specifying control modules to be downloaded to the controllers 12, the I/O devices 20 and 22 and the field devices 25-39 to control units or other equipment within the process control system 10. As part of these configuration activities, the configuration engineer or other user specifies the specific relationships between higher level entities within the process plant, such as units, and lower level entities within the process plant, such as equipment and control modules associated with each of the units. After the control modules are created for and associated with each of units, these control modules can be downloaded to the controllers 12 and, if necessary, to the I/O devices 20, 22 and to the field devices 25-39, and may be implemented thereon to control the operation of the process. Still further, at some point within the configuration activity, the configuration engineer will save the current configuration of the process control system 10 in a configuration database 55 which may be stored in, for example, one of the workstations 14.

If the process is a batch process, a batch executive routine 56 (illustrated as being stored in a different one of the workstations 14) may be used to run batches using different recipes on particular units within the process control system 10 at different times. During operation, the batch executive routine 56 may reserve certain units within the process control system 10, and may provide recipe and other operator generated information to the control modules 40, 45 and 46 within the controllers 12, the I/O devices 20, 22 and the field devices 25-39 to implement one or more phases of a batch process. The batch executive 56 may also monitor these phases until completed. Of course, during this time, the control modules 40, 45 and 46 will detect events, such as significant problems like alarms, or less serious problems, like warnings or notifications, based on the operation of the process and will send event signal to one or more of the operator workstations 14 where these events (e.g., alarms) are displayed to an operator or maintenance person who may, if necessary, take actions to alleviate the condition(s) giving rise to the events. Of course, during operation, a process operator, such as a batch operator, may provide changes to the batch executive routine 56 by providing new batches to run, new recipes, changes to existing batch runs and recipes, etc.

As is known, the data historian 16 includes a processor 60 and a memory 62 that stores programming or routines to be run on the processor 60 to monitor data or messages on the communication network 18. These routines monitor changes made to the batch runs or modules within the process plant by an operator or other user via any one of the workstations 14, as well as events generated by any of the modules 40, 45 and 46 or any of the devices 12, 20, 22 or 25-39. These monitoring routines store the collected information in a manner that can be retrieved at a later time to, for example, produce a report of the past operation of the different elements and, in particular, the different units within the process control system 10. The data collected by the data historian 16 can be any data that is generated at the operator workstations 14, such as changes in setpoints in units, or other control data sent by an operator making changes to equipment or control modules within the process plant or data generated by the control modules within the process plant, including event data, such as alarms. To enable the data historian 16 to function properly to be able to associate data received from within the process plant, the data historian 16 includes a configuration memory or list 64 that indicates the relationships between different higher level entities, such as units, and lower level entities, such as equipment and control modules, as those relationships are specified or stored within the configuration database 55. The data historian 16 uses this configuration information to associate the data received from the workstations 14 or the control modules 40, 45, and 46 with the proper higher level entity, such as with the proper unit, so that the data historian 16 can keep track of information, such as changes made to or events associated with each of the different higher level entities within the process plant. Furthermore, the data historian 16 may use this configuration information to determine if alarms or events generated within the process plant are being generated by a unit that is actually currently running or is in operation as part of a batch process and therefore are relevant to the operational status of the unit or if, instead, these events are associated with an inactive unit and therefore not relevant to the operational status of the unit.

The configuration application 50 of FIG. 1 includes a data historian update routine 66 which automatically informs the data historian 16 of the relationships between higher level entities, such as units, and lower level entities, such as equipment and modules within the process control network configuration at, for example, the time that control modules are created and downloaded to the controllers 12, the I/O devices 20 and 22 or the field devices 25-39. In particular, the routine 66 may detect changes made to the configuration of any and each unit within the process plant as stored in the configuration database 55. When these changes are made, such as by an operator, a configuration engineer, or any other authorized user, the routine 66 may provide a new configuration list or may provide changes to be made to the configuration list 64 stored within the data historian 16. Of course, the routine 66 will provide this new configuration list or changes to the configuration list 64 via the communication network 18, but could, alternatively provide this information in any other desired manner, such as via a different shared or dedicated communication network. In instances in which the configuration database 55 is stored in the same device as the data historian 16, such as the same server or database, then the routine 66 may provide such changes directly without using an external communication network.

Of course, the new configuration information may be provided as a result of any significant event associated with changing the configuration of the process control system 10, including for example the creation of changes by the user, the downloading of changes or new control modules 40, 45, 46 to the controllers 12 or other devices or any other desired event, as long as the routine 66 operates automatically and consistently to send configuration changes to the data historian 16 each time a configuration change is made that alters or affects the information or relationships stored in the data historian configuration memory 64.

During operation, the data historian 16 will monitor the information sent from the modules 40, 45 and 46 which may include the relevant values, settings and measurements associated with or being made in the process plant and will then use the configuration list 64 to determine the higher level entity to which this data belong or is associated. In one particular case, the data historian 16 is programmed to receive alarms created by alarm generating software within some or all of the controllers 12, the I/O devices 20 and 22 or the field devices 25 through 39. Generally speaking, the data historian 16 may receive and store different categories of events and alarms including, for example, process alarms (which are typically generated by a process control software modules, such as those made up of communicatively interconnected function blocks, forming process control routines used during runtime of the process), hardware alarms, such as alarms generated by the controllers 12, I/O devices 20 and 22 or other devices, pertaining to the state or functioning condition of these devices, and device alarms, which are generated by some or all of the field devices 25 through 39 to indicate problems associated with those devices. These or other categories of alarms may be generated in any desired manner and any desired error detection and alarm generating software may be used to send alarms to the data historian 16, which is configured to receive and recognize these alarms using any desired protocol or communication strategy. Of course, the alarms or events may include any desired information associated with the event, such as the category of the event (e.g., process, device or hardware alarm), the type of event (communication, failure, advisory, maintenance, etc.), the priority of the event, the module, device, hardware, node or area to which the event pertains, whether the event has been acknowledged or suppressed, whether the event is active, etc.

Aspects of the system 10, including further details regarding the data historian 16, are disclosed in further detail in U.S. patent application Ser. No. 10/385,310, filed on Mar. 10, 2003, entitled "AUTOMATIC LINKAGE OF PROCESS EVENT DATA TO A DATA HISTORIAN," which is hereby expressly incorporated by reference herein.

Figure 2:
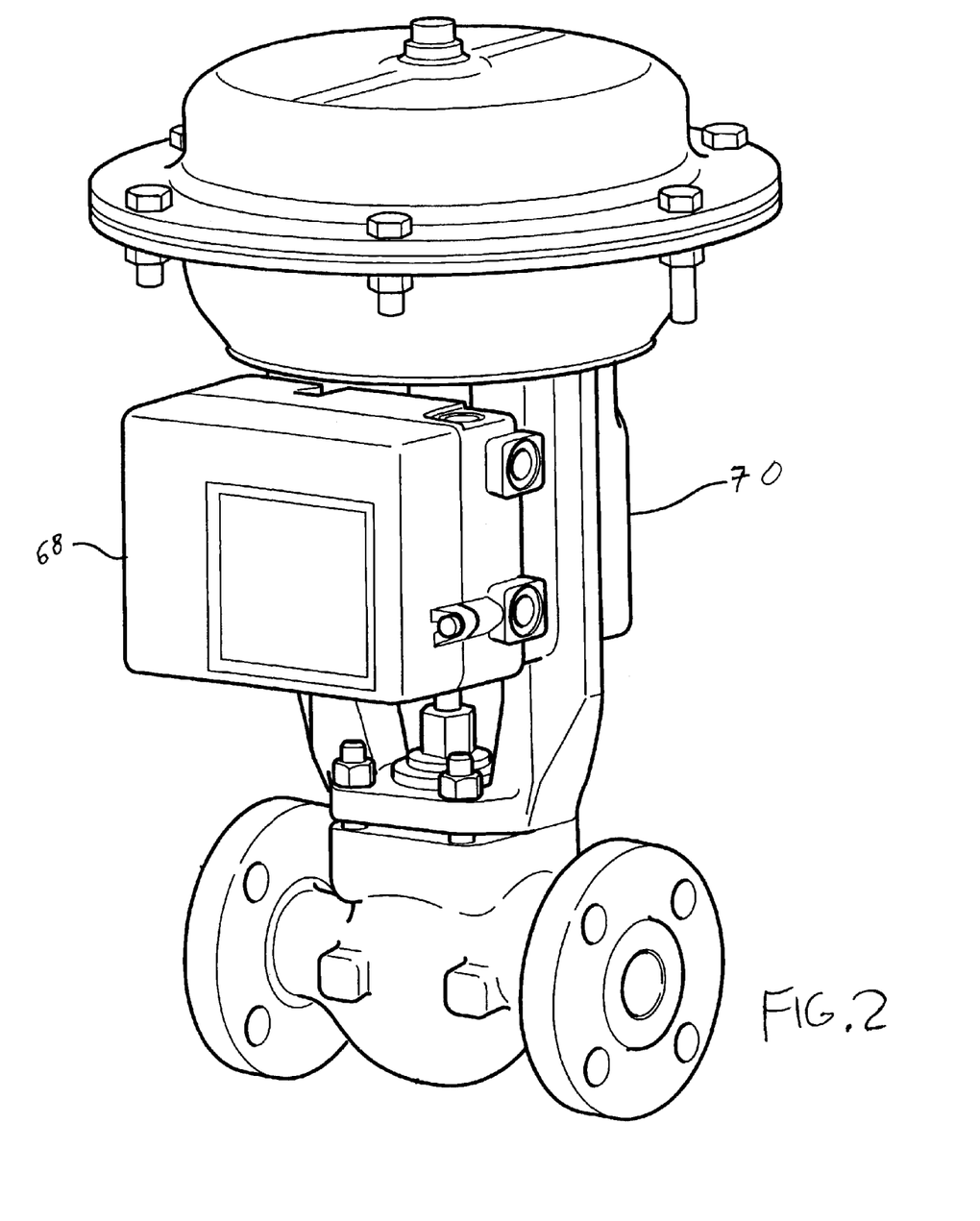
FIG. 2 is a perspective view of an exemplary field instrument mounted to a process control valve.
Figure 3:
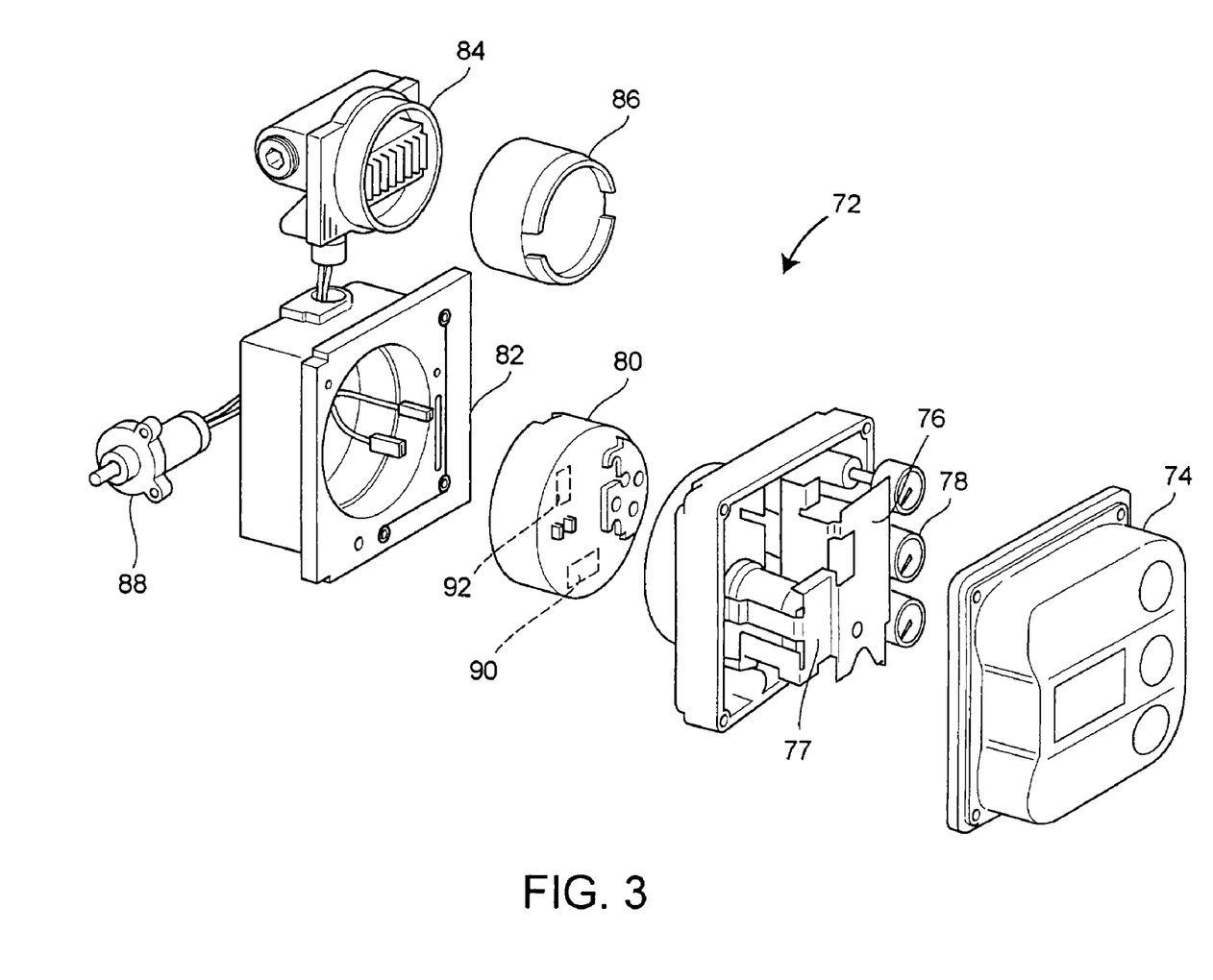
FIG. 3 is an exploded view of a digital valve positioner.

FIG. 2 depicts a field instrument 68 that is mounted to a valve actuator 70. The field instrument 68 may be, for example, a digital valve positioner 72, that is depicted in an exploded view in FIG. 3, to better show the components thereof. With reference to FIG. 3, the digital valve positioner 72 includes a main cover 74, a pneumatic relay assembly 76, an I/P converter 77, gauges 78, an electronics module 80, a main housing 82, a terminal box 84, a terminal box cover 86, and a travel sensor 88. The electronics module 80 includes a microcontroller 90 and a memory device in the form of a non-volatile random-access memory (RAM) 92.

Further details regarding digital positioners that may be utilized in the system 10 are disclosed in U.S. patent application Ser. No. 10/139,008, filed on May 3, 2002, entitled "METHOD AND APPARATUS FOR PERFORMING DIAGNOSTICS IN A CONTROL LOOP OF A CONTROL VALVE," which is hereby expressly incorporated by reference herein.

Figure 4:
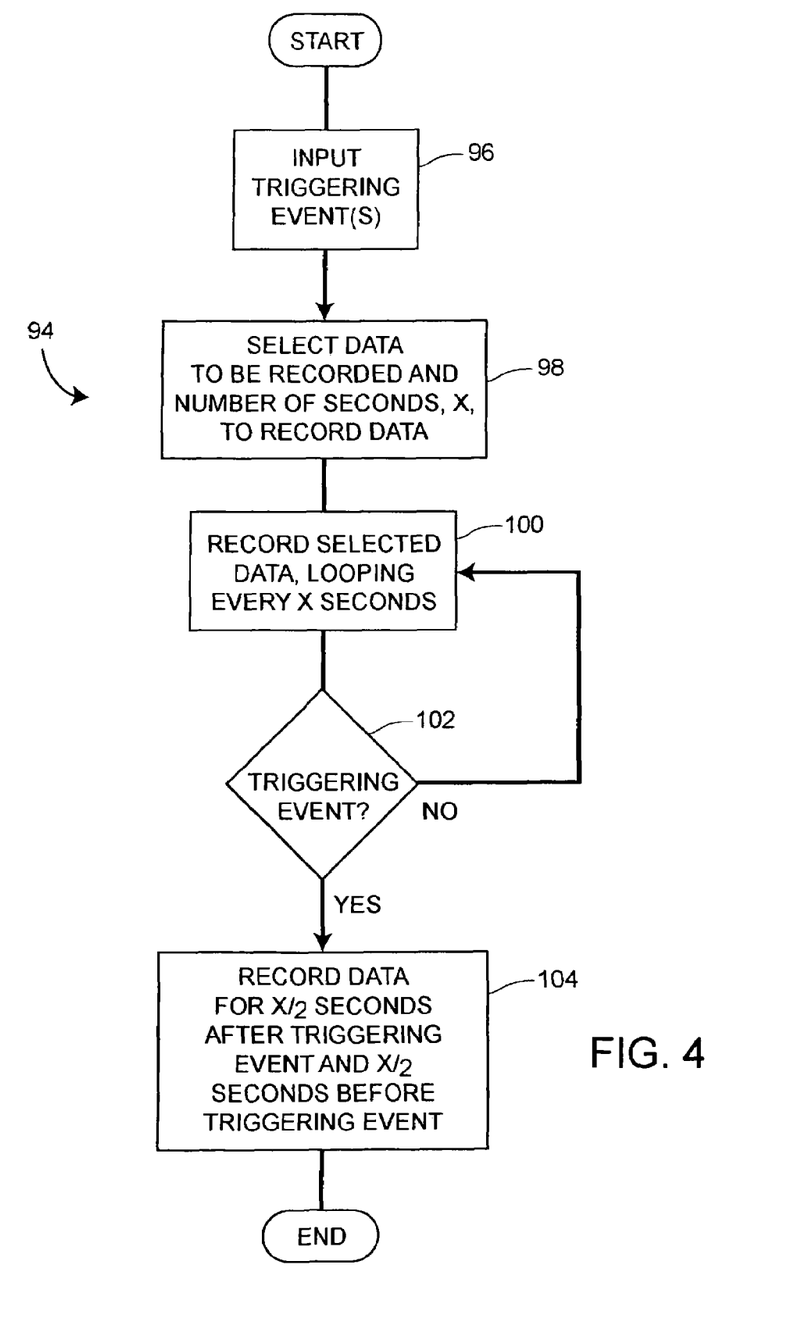
FIG. 4 is a logic diagram depicting a routine for implementing a method of recording data before, during, and after the occurrence of a triggering event.

With reference now to FIG. 4, a routine 94 is shown that may be programmed into the microcontroller 90 for recording data before, during, and after the occurrence of a predetermined process event that may be used as a triggering event. As depicted at a block 96, one or more triggering events may be input. As depicted at block 98, data to be recorded and an elapsed time ("x seconds") during which data is to be recorded are also input into the routine 94. At block 100, selected data is recorded, and the recorded data may be looped (i.e., overwritten in the event memory is limited) every time the elapsed time expires. Next, the routine 94 checks for the occurrence of a triggering event at block 102. If a triggering event has not occurred, the routine 94 repeats block 100, continuing to record the selected data. If a triggering event occurs, data is recorded for half of the elapsed time (x/2 seconds) after the triggering event and for half of the elapsed time before the triggering event at block 104, and then the routine 94 ends. Thus, over the elapsed time that is selected at block 98, that is centered about the occurrence of the triggering event that is input at block 96, data is recorded and maintained, and may then be stored in the non-volatile RAM 92 for later processing and/or retrieval by a user.

Figure 5:
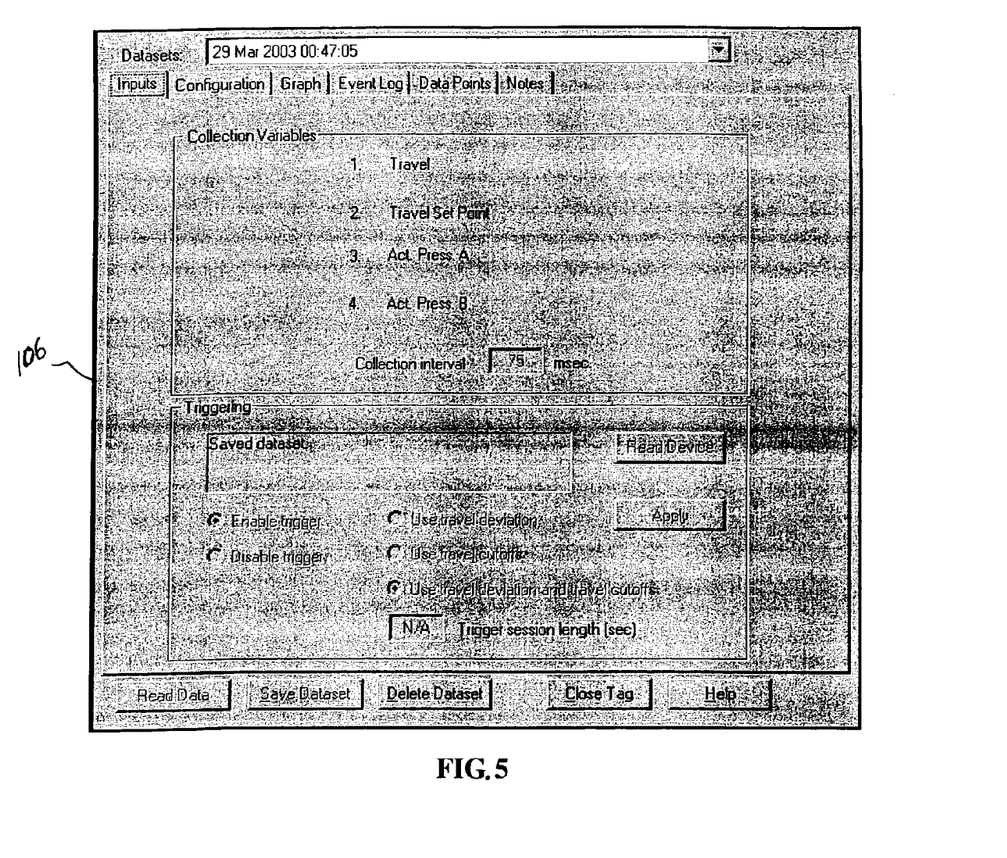
FIG. 5 is a depiction of a computer display screen showing a triggering event definition page.
Figure 6:
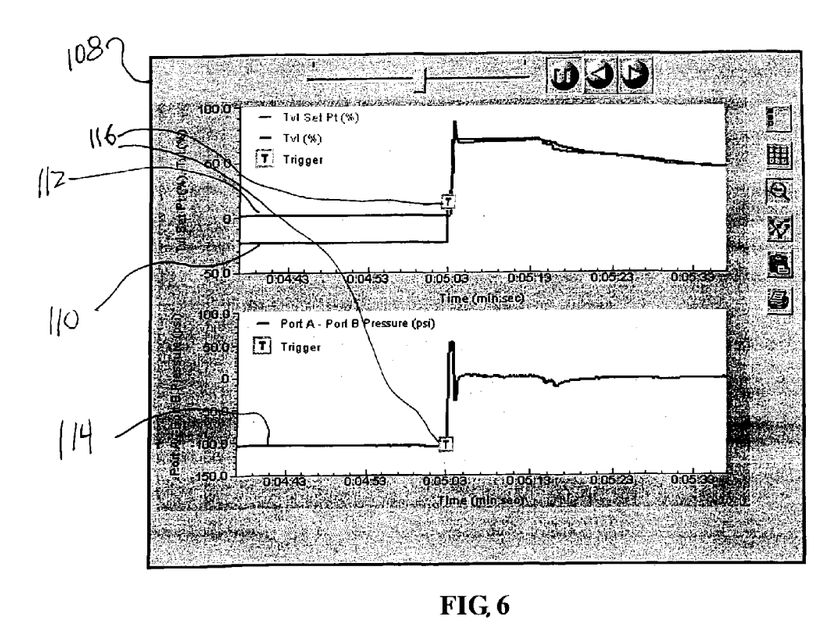
FIG. 6 is a depiction of a computer display screen showing data collected before, during, and after a triggering event.
Figure 7:
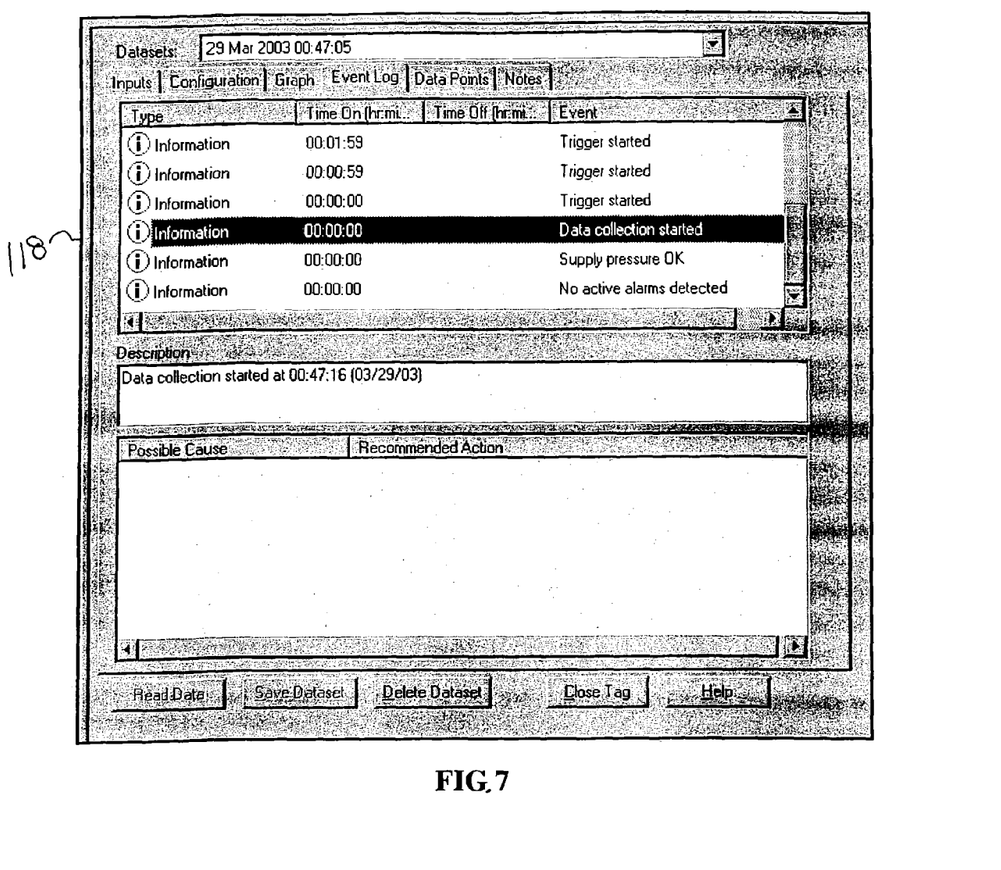
FIG. 7 is a depiction of a computer display screen showing an event log.

Exemplary computer display screens that may be displayed on a computer configured to capture data upon the occurrence of a triggering event are presented in FIGS. 5 though 7. As depicted a computer display 106 in FIG. 5, the user may select any four data channels to record data corresponding to the following parameters: travel; travel set point; port A pressure; port B pressure; relay position; and I/P drive, and the user can also select the session length and the triggering event. Examples of triggering events include a large valve element travel deviation or a reference signal crossing a cutoff point. The latter is particularly useful when capturing data for turbine bypass or compressor anti-surge valves.

In addition to travel cutoffs and error signal triggers, any or all of the following events may be used as triggering events: travel of a component, (e.g., a valve stem) being high or low; the presence of an auxiliary input, such as an auxiliary input that may be connected to a digital valve positioner; an I/P drive signal being high or low, valve positioner supply pressure being high or low; data collected by a sensor being out of range; failure of a travel sensor, pressure sensor, temperature sensor, or I/P device; an electronics failure (non-volatile memory failures and reference voltage failures will cause the positioner to move the valve to its fail position); a positioner integrator being saturated high or low; air mass flow high or low; pneumatic relay position high positive or high negative; excessive cycling of a system component (e.g., valve stem travel variance greater than set point variance); reference signal change (e.g., change in commanded valve position); temperature out of range; and pressure control error signal (e.g., for positioners that are capable of switching to pressure control in the event of a travel sensor failure).

With regard to the use of a positioner integrator being saturated high or low as a triggering event, servo controllers typically have proportional, integral, and derivative action. Integral action means that the I/P drive signal has a component that is proportional to the integral of the error signal over time. Integrators tend to drive the error signal to zero since they "wind up" until the set point and feedback signals are the same. In high gain servos, such as positioners, integral action is supplementary and is used to correct for shifts in travel caused by temperature variations, supply pressure variations, and so forth. However, if the integrator output gets too high, this usually means that the I/P is being driven harder than normal. For example, a large leak in the actuator will cause the integrator to wind up so that the relay can provide make up air. Although there is no shift in actuator travel, the integrator is wound up and indicates that there may be a malfunction.

With regard to a high air mass flow being used as a triggering event, air mass flow may be calculated from measurements of relay position and pressure drop across the relay. Pressure drop may be found by taking the difference between the supply pressure sensor reading and the output pressure sensor reading. In short, $dm/dt = K\,Y\,A\,sqrt(2\,rho\,(p1-p2))$, where dm/dt is air mass flow, K is a discharge coefficient (constant), Y is an expansion factor (constant), A is the valve curtain area (a function of relay position), rho is upstream fluid density (calculated from supply pressure), p1 is the upstream pressure (supply pressure), and p2 is the downstream supply pressure (output pressure). Additional details of air mass flow calculations can be found in the above-noted U.S. patent application Ser. No. 10/139,008.

It is desirable to include collection of data before, during, and after the triggering event, in order to provide information that will help determine the cause and the effect of the triggering event.

In addition to triggering events that originate within the field instrument, networked field instruments (i.e., FOUNDATION® Fieldbus devices) may be used to trigger off of and collect data from any signal on a network segment. For example, if a flow transmitter and a control valve are on the same network segment, the control valve may be used to monitor transmitter data and create a data record upon the occurrence of a triggering event. Additionally, networked field instruments may use process variables, such as a process variable change and/or a process variable being high or low, as triggering events.

FIG. 6 depicts a computer display 108, showing an example of how data, such as plots of travel set point 110, travel 112 and pressure differential 114, may be displayed to show the changes that may occur before, during, and after a triggering event, signified by a symbol "T" within boxes 116 in the plots of FIG. 6.

FIG. 7 depicts a computer display 118, showing an example of how a log of events may be displayed.

Data collection and data storage may thus be performed within the digital valve positioner 72 using the microcontroller 90 and the non-volatile RAM 92, effectively providing an "on-board" diagnostic capability to such a field instrument. Software, such as, for example, ValveLink® brand software, available from Emerson Process Management, may be used to download and display captured data from the digital valve positioner 72, which is usually done long after a triggered event has occurred. Triggering and storing data in the digital valve positioner 72 is particularly important since it is often not practical to continuously read large amounts of ancillary instrument data over field networks. For example, a typical chemical plant might have several thousand control valves and many times that number in transmitters and managing continuous streams of data from such a large number of devices is prohibitive.

Although the systems and methods described herein are preferably implemented in software, they may be implemented in hardware, firmware, etc., and may be executed by any other processor associated with a process control system. Thus, the routines described herein may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc. (which is viewed as being the same as or interchangeable with providing such software via a transportable storage medium). Additionally, different portions of this software may be separately implemented on different processors and/or within different devices, if so desired.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A diagnostic system for a field device in a process control apparatus, comprising:
    at least one sensor associated with the process control apparatus;
    a computer located on the field device and adapted to receive data from the sensor over predetermined intervals of time, to detect an occurrence of a predetermined process event and to overwrite previously received sensor data if the occurrence of the predetermined process event is not detected once the predetermined interval of time has elapsed; and
    a memory device operatively connected to the computer and adapted to store sensor data received by the computer if the occurrence of the predetermined process event is detected, wherein at least one of the computer or the memory device is further adapted to store sensor data collected over the interval of time coinciding with the occurrence of the predetermined process event and at times prior to the detected occurrence of the predetermined process event.

2. The diagnostic system of claim 1, wherein the memory device is further adapted to store sensor data received by the computer at times subsequent to the occurrence of the predetermined process event.

3. The diagnostic system of claim 1, wherein the computer is a microcontroller located on the field device.

4. The diagnostic system of claim 1, wherein the memory device is located on the field device.

5. The diagnostic system of claim 4, wherein the memory device is a non-volatile RAM.

6. The diagnostic system of claim 1, wherein the field device is a valve positioner.

7. The diagnostic system of claim 1, wherein the predetermined process event is an excessive travel deviation of a valve element.

8. The diagnostic system of claim 1, wherein the predetermined process event is a sensor signal, representing a sensed valve parameter, crossing a cutoff point.

9. A method of monitoring the performance of a process control system including at least a first field device, comprising:
    providing at least one sensor associated with the first field device;
    providing a memory device operably coupled to the first field device;
    collecting data from the sensor over predetermined intervals of time;
    detecting the occurrence of a predetermined process event;
    overwriting previously received sensor data if the occurrence of the predetermined process event is not detected once the predetermined interval of time has elapsed; and
    storing data on the memory device from the sensor collected over the interval of time coinciding with the occurrence of the predetermined process event and at a time prior to the occurrence of the predetermined process event if the occurrence of the predetermined process event is detected.

10. The method of claim 9, further including storing data from the sensor collected at times subsequent to the occurrence of the predetermined process event.

11. The method of claim 9, wherein the first field device detects the occurrence of the predetermined process event and communicates the occurrence of the predetermined process event to at least a second field device to store data on a second memory device associated with the second field device.

12. The method of claim 9, wherein the predetermined process event is an excessive travel deviation of a valve element.

13. The method of claim 9, wherein the predetermined process event is a sensor signal, representing a sensed valve parameter, crossing a cutoff point.

14. A field device for a process control apparatus, comprising:
    at least one sensor;
    a computer located on the field device and adapted to receive data from the sensor over predetermined intervals of time, to detect an occurrence of a predetermined process event and to overwrite previously received sensor data if the occurrence of the predetermined process event is not detected once the predetermined interval of time has elapsed; and
    a memory device operatively connected to the computer and adapted to store sensor data received by the computer at a time corresponding to the occurrence of the predetermined process event if the occurrence of the predetermined process event is detected, wherein at least one of the computer or the memory device is further adapted to store sensor data collected over the interval of time coinciding with the occurrence of the predetermined process event and at times prior to the detected occurrence of the predetermined process event.

15. The field device of claim 14, wherein the predetermined process event is the occurrence of a sensed parameter being out of a predetermined range.

16. The field device of claim 14, wherein the predetermined process event is the failure of a sensor.

17. The field device of claim 14, wherein the predetermined process event is a component failure.

18. The field device of claim 14, wherein the predetermined process event is a process variable change.

19. The field device of claim 14, wherein the predetermined process event is a command from a process control workstation.

* * * * *